(12) United States Patent
Kaneko

(10) Patent No.: US 6,796,042 B1
(45) Date of Patent: Sep. 28, 2004

(54) SURVEY POINT INDICATING INSTRUMENT

(75) Inventor: Kenji Kaneko, Tokyo (JP)

(73) Assignee: PENTAX Precision Co., Ltd., Tokyo (JP)

( * ) Notice: Subject to any disclaimer, the term of this patent is extended or adjusted under 35 U.S.C. 154(b) by 0 days.

(21) Appl. No.: 10/641,038

(22) Filed: Aug. 15, 2003

(30) Foreign Application Priority Data

Aug. 21, 2002 (JP) ........................................ 2002-240297
Aug. 28, 2002 (JP) ........................................ 2002-248318

(51) Int. Cl.⁷ ................................................ G01C 5/00
(52) U.S. Cl. ............................. 33/290; 33/286; 356/139
(58) Field of Search ......................... 33/290, 291, 292, 33/276, 227, 286, 285, 277, DIG. 21; 356/3.1, 139

(56) References Cited

U.S. PATENT DOCUMENTS

| | | | | |
|---|---|---|---|---|
| 5,218,770 A | * | 6/1993 | Toga | .......................... 33/276 |
| 5,488,471 A | * | 1/1996 | McClenahan et al. | . 356/139.09 |
| 5,535,230 A | * | 7/1996 | Abe | .......................... 372/43 |
| 5,539,990 A | * | 7/1996 | Le | .............................. 33/283 |
| 5,777,899 A | * | 7/1998 | Kumagai | ..................... 702/94 |
| 6,295,174 B1 | * | 9/2001 | Ishinabe et al. | ............. 359/834 |
| 6,314,651 B1 | * | 11/2001 | Ohtomo et al. | ................ 33/290 |
| 6,624,402 B2 | * | 9/2003 | Kaneko et al. | ........... 250/201.2 |
| 6,718,643 B2 | * | 4/2004 | Tamamura | .................... 33/286 |

FOREIGN PATENT DOCUMENTS

| | | |
|---|---|---|
| JP | 62-10615 | 1/1987 |
| JP | 3096140 | 8/2000 |

* cited by examiner

*Primary Examiner*—Christopher W. Fulton
*Assistant Examiner*—Amy R. Cohen
(74) *Attorney, Agent, or Firm*—Greenblum & Bernstein, P.L.C.

(57) ABSTRACT

A survey point indicating instrument, for recognizing a line of sight visually, includes a collimating lens, two light sources being positioned so that optical axes of the two light sources intersect each other on an optical axis of the collimating lens at a focal point of the collimating lens; a driving circuit for controlling light emissions of the two light sources independently from each other; and a light shield plate having a slit, and positioned between the focal point and the two light sources so that light rays emitted from each of the two light sources to travel in an area between the optical axes are allowed to pass through the slit while other light rays emitted from each of the two light sources are cut off by the light shield plate to prevent the other light rays from traveling outside the area between the optical axes.

8 Claims, 3 Drawing Sheets

Prior Art

Prior Art

SURVEY POINT INDICATING INSTRUMENT

BACKGROUND OF THE INVENTION

1. Field of the Invention

The present invention relates to a surveying instrument, and more specifically, to a survey point indicating instrument, provided in a surveying instrument, for indicating a survey point so that the direction of a line of sight can be recognized visually from the side of the target.

2. Description of the Related Art

FIG. 3 shows a diagrammatic representation of a conventional survey point indicating instrument (first conventional survey point indicating instrument) for indicating a survey point. This survey point indicating instrument has a translucent plate 27 having different colors which is positioned on the optical axis of a collimating lens 25 at a focal point thereof. A light source 23 is disposed behind the translucent plate 27. Primary light rays emitted from the light source 23 are diffused as secondary light rays through the translucent plate 27, and are subsequently collimated through the collimating lens 25 to eventually reach a target.

In such a conventional survey point indicating instrument, if the collimated light rays that travel toward the target are viewed from the target side with a half of the translucent plate 27 above the optical axis of the collimating lens 25 colored green and the other half of the translucent plate 27 below the optical axis of the collimating lens 25 colored red, a mixture of red and green colors is viewed in the vicinity of the optical axis of the collimating lens since the collimated light rays are red and green on right and left sides of the optical axis of the collimating lens, respectively. Namely, red light is seen on the left side of the optical axis of the survey point indicating instrument, green light is seen on the right side of the optical axis of the survey point indicating instrument, and a mixture of red and green lights is seen in the vicinity of the optical axis of the survey point indicating instrument.

In this conventional survey point indicating instrument, the light emitted from the light source 23 toward the target can easily be recognized visually because the light source 23 can be viewed having a certain range of width.

However, in the first conventional survey point indicating instrument, no light rays emitted from the light source 23 are directly viewed, only secondary light rays that are passed through the translucent plate 27 are viewed by a surveyor. Accordingly, a high-intensity light source must be used to serve as the light source 23 when the light emitted therefrom is viewed from a great distance, which inevitably increases power consumption.

FIG. 4 shows a diagrammatic representation of another conventional survey point indicating instrument (second conventional survey point indicating instrument) for indicating a survey point which is disclosed in Japanese laid-open utility model publication No.62-10615. In this conventional survey point indicating instrument, two bundles of light rays emitted from two LEDs 33 are reflected by two reflecting surfaces of a prism 37 to be projected toward a target via a collimating lens 35. The prism 37 is positioned on the optical axis of the collimating lens 35. In the second conventional survey point indicating instrument, a survey point can be indicated by primary light rays, not secondary light rays, since the survey point indicating instrument uses no translucent plate such as the translucent plate 27 shown in FIG. 3. Accordingly, the light rays emitted from the two LEDs 33 toward the target can easily be recognized visually even from a great distance. Moreover, unlike the first conventional survey point indicating instrument shown in FIG. 3, not only a survey point can be indicated by primary light rays, but also a collimating lens does not have to be provided for each light source in the second conventional survey point indicating instrument.

However, it is necessary to provide the second conventional survey point indicating instrument with a prism (the prism 37) having two reflecting surfaces. This is a cause of increasing the cost of production.

FIG. 5 shows a diagrammatic representation of another conventional survey point indicating instrument (third conventional survey point indicating instrument) for indicating a survey point which is disclosed in Japanese patent No.3096140. This conventional survey point indicating instrument is provided with two collimating lenses 45, two light sources 43 and two light shield plates 47. The optical axes of the two collimating lenses 45 extend parallel to each other. The two light sources 43 are positioned on the optical axes of the two collimating lenses 45, respectively, and each light source 43 emits visible light rays. Each of the two light shield plates 47 is positioned at the back focal point (focal point on the light source 43 side) of the associated collimating lens 45 to cut off the light rays which are emitted from the associated light source 43 to prevent the light rays from traveling outside the area between the parallel optical axes of the two collimating lenses 45. Due to this optical arrangement, although light rays emitted from each light source 43 to proceed toward the associated collimating lens 45 are half cut off by the associated light shield plate 47, the remaining half of the light rays reach the associated collimating lens 45 without being diffused, unlike the first conventional survey point indicating instrument. Accordingly, the light emitted from each light source 43 toward the target can easily be recognized visually even from a great distance. Additionally, there is no need to provide the survey point indicating instrument with a prism (the prism 37) having two reflecting surfaces, unlike the second conventional survey point indicating instrument shown in FIG. 4.

However, the third conventional survey point indicating instrument shown in FIG. 5 must be provided with two survey point indicating instrument lenses (the survey point indicating instrument lenses 45), even though a survey point can be directly indicated by primary light rays emitted from each light source 43. This is a cause of increasing the cost of production.

SUMMARY OF THE INVENTION

The present invention provides a low-cost and low-power-consumption survey point indicating instrument, provided in a surveying instrument, for indicating a survey point so that the direction of a line of sight can be easily recognized visually from the target side, even from a long distance.

According to an aspect of the present invention, a survey point indicating instrument is provided for recognizing a collimation direction visually, the survey point indicating instrument including a collimating lens; two light sources positioned so that optical axes of the two light sources intersect each other on an optical axis of the collimating lens at a focal point of the collimating lens; a driving circuit for controlling light emissions of the two light sources independently from each other; and a light shield plate having a slit, and positioned between the focal point and the two light sources so that light rays emitted from each of the two light sources to travel in an area between the optical axes are allowed to pass through the slit while other light rays emitted from each of the two light sources are cut off by the light shield plate to prevent the other light rays from traveling outside the area between the optical axes.

It is desirable for the driving circuit to control the light emissions of the two light sources so that the two light sources flash periodically at different frequencies.

It is desirable for the two light sources to emit different colored lights.

It is desirable for the two light sources to emit red light and green light, respectively.

Among light rays which are passed through the slit to intersect each other at the focal point, it is desirable for light rays thereof incident on a central portion of the collimating lens to be collimated thereby to travel as a parallel light beam after passing through the collimating lens, while other light rays thereof incident on a peripheral portion of the collimating lens to firstly converge after passing through the collimating lens, and to subsequently diverge.

It is desirable for each of the two light sources to be an LED.

According to another embodiment, a survey point indicating instrument is provided, including a collimating lens; two light sources positioned behind the collimating lens so that optical axes of the two light sources intersect each other on an optical axis of the collimating lens at a back focal point of the collimating lens; a light shielding device, positioned between the collimating lens and the two light sources, for cutting off light rays emitted from each of the two light sources to prevent light rays from traveling outside an area between the optical axes, and for allowing the light rays emitted from each of the two light sources to travel within the area to pass therethrough; and a driving circuit for controlling light emissions of the two light sources independently from each other.

It is desirable for the light shielding device to include a light shield plate positioned between the back focal point of the collimating lens and the two light sources.

The present disclosure relates to subject matter contained in Japanese Patent Application No.2002-240297 (filed on Aug. 21, 2002) and No.2002-248318 (filed on Aug. 28, 2002) which are expressly incorporated herein by reference in their entireties.

BRIEF DESCRIPTION OF THE DRAWINGS

The present invention will be described below in detail with reference to the accompanying drawings in which.

DESCRIPTION OF THE PREFERRED EMBODIMENT

Figure 1:
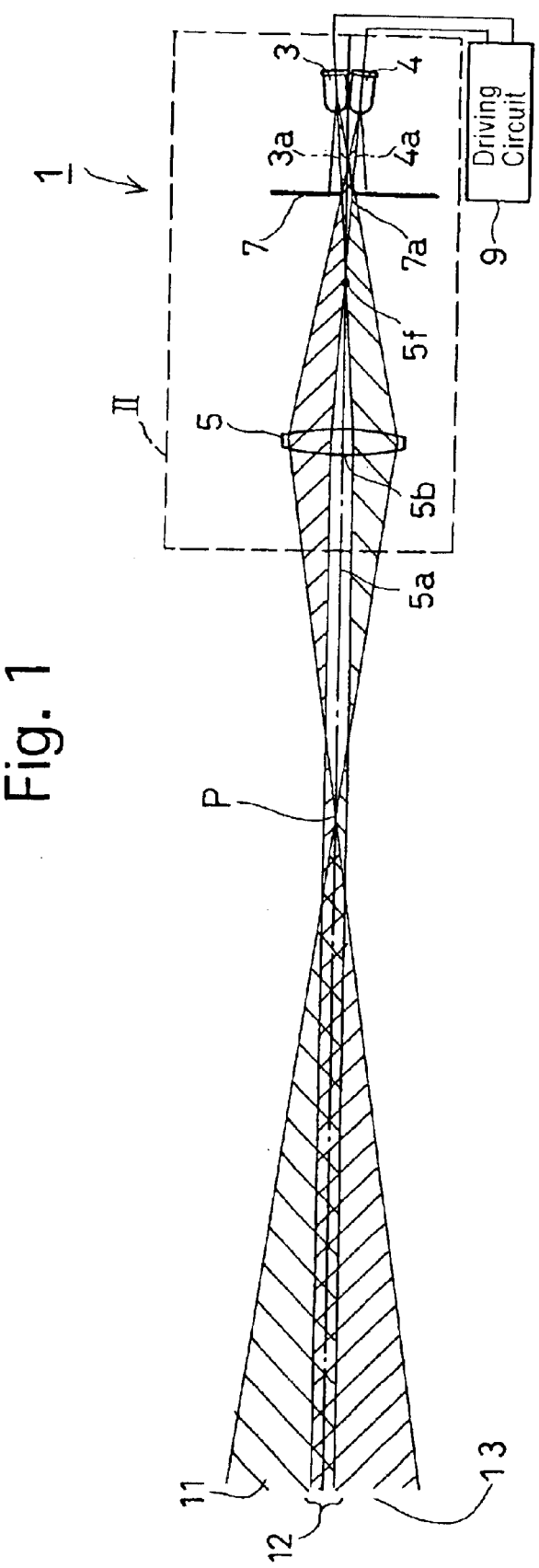
FIG. 1 is a diagrammatic representation, viewed from above, of an embodiment of a survey point indicating instrument for indicating a survey point, according to the present invention.
Figure 2:
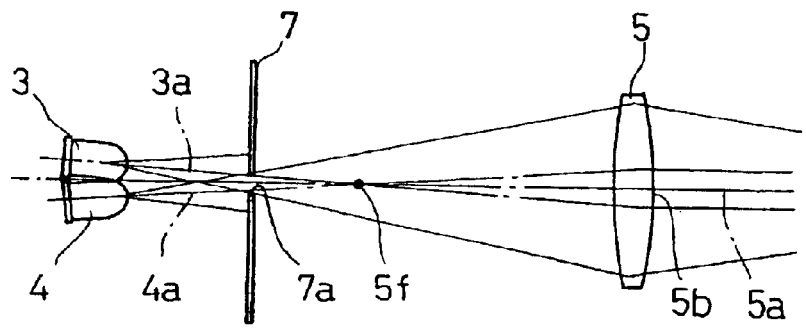
FIG. 2 is an enlarged diagram of a fundamental portion of the survey point indicating instrument shown in FIG. 1, which is surrounded by a dotted line II in FIG. 1.

As shown in FIGS. 1 and 2, an embodiment of a survey point indicating instrument 1 for indicating a survey point is provided with two LEDs (light sources) 3 and 4, a collimating lens 5, a light shield plate 7 and a driving circuit 9.

The LED 3 is a red LED and the LED 4 is a green LED. The LEDs 3 and 4 are positioned on a common horizontal plane including an optical axis 5a of the collimating lens 5, and are axisymmetrical with respect to the optical axis 5a. The collimating lens 5 and the two LEDs 3 and 4 are positioned to be opposed to each other, while optical axes 3a and 4a of the two LEDs 3 and 4 intersect each other on the optical axis 5a at a back focal point 5f of the collimating lens 5.

The collimating lens 5 is commonly used for the two LEDs 3 and 4. Namely, light rays emitted from the two LEDs 3 and 4 to be incident on a central portion 5b of the collimating lens 5 are collimated thereby to travel as a parallel light beam after passing through the collimating lens 5, while other light rays emitted from the two LEDs 3 and 4 to be incident on a periphery of the collimating lens 5 converge after passing through the collimating lens 5.

The light shield plate 7 is provided at a center thereof with a slit 7a. The light shield plate 7 is positioned between the back focal point 5f of the collimating lens 5 and the two LEDs 3 and 4 so that optical axes 3a and 4a of the two LEDs 3 and 4 pass through the slit 7a to intersect each other on the optical axis 5a at the back focal point 5f of the collimating lens 5. Therefore, the light rays emitted from each of the two LEDs 3 and 4 to travel in the area between the optical axes 3a and 4a of the two LEDs 3 and 4 are allowed to pass through the slit 7a while the remaining light rays which are emitted from each of the two LEDs 3 and 4 are cut off by the light shield plate 7 to prevent the light rays from traveling outside the area between the optical axes 3a and 4a of the two LEDs 3 and 4.

With the above described structure of the survey point indicating instrument 1, among the light rays which are passed through the slit 7a to intersect each other at the focal point 5f, light rays incident on a central portion of the collimating lens 5 are collimated thereby to travel as a parallel light beam after passing through the collimating lens 5. Whereas, other light rays incident on a peripheral portion of the collimating lens 5 firstly converge after passing through the collimating lens 5, and subsequently diverge (see FIG. 1).

Light emissions of the two LEDs 3 and 4 are controlled independently from each other by the driving circuit 9. In the present embodiment of the survey point indicating instrument 1, the two LEDs 3 and 4 are driven to flash periodically at different frequencies. Specifically, the red LED 3, which is positioned on the left side as viewed from the target side (the upper side as viewed in FIG. 1), is driven to flash at a constant frequency of two hertz (2 Hz), while the green LED 4, which is positioned on the right side as viewed from the side of the target, is driven to flash at a constant frequency of one hertz (1 Hz).

If the two LEDs 3 and 4 are driven in such a manner, the light emission of the red LED 3 is viewed as a intermitting light at a fast intermitting rate in a left portion 11 of the traveling light as viewed from the target side, and the light emission of the green LED 4 is viewed as a intermitting light at a slow intermitting rate in a right portion 13 of the traveling light as viewed from the target side.

In the present embodiment of the survey point indicating instrument 1, a central portion 12 of the projecting light that shows a survey point can easily be distinguished visually from a peripheral portion thereof because the light rays emitted from the two LEDs 3 and 4 to be incident on the central portion 5b of the collimating lens 5 are collimated thereby to travel as a parallel light beam with a constant width after passing through the collimating lens 5 and because the parallel light beam travels in a state of being mixed with a divergent light rays emitted from the two LEDs 3 and 4 from the point P in front of the collimating lens 5.

In the present embodiment of the survey point indicating instrument 1, the central portion 12 of the projecting light that shows a survey point is successfully made to have a constant width since the optical axes 3a and 3b of the two LEDs 3 and 4 are made to intersect each other on the optical axis 5a at a back focal point 5f of the collimating lens 5.

Although the red LED 3 and the green LED 4 are used as two light sources which emit red light and green light, respectively, in the present embodiment of the survey point indicating instrument, each of the red LED 3 and the green LED 4 can be replaced by an LED which emits light of any other color, or two LEDs which emit light of the same color can be used. Moreover, the red LED 3 and the green LED 4 can be replaced by any other types of light sources.

Although light emissions of two light sources are controlled independently from each other so that the two light sources flash periodically with different periodicities in the present embodiment of the survey point indicating instrument, the duty ratios or the intensities of the two light sources can be set different from each other.

The visibility of the projecting light showing a survey point is further improved by an appropriate combination of a light-emitting pattern (light-emitting frequency/duty ratio), a light color, and an intensity of each light source.

Figure 3:
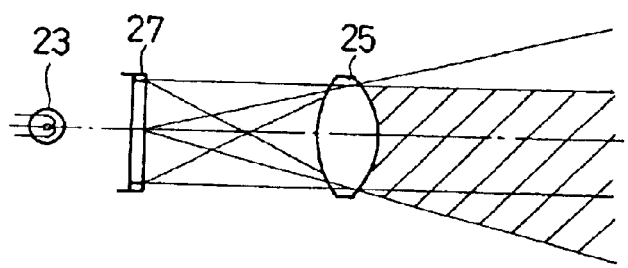
FIG. 3 is a diagrammatic representation, viewed from above, of a first conventional survey point indicating instrument for indicating a survey point.
Figure 4:
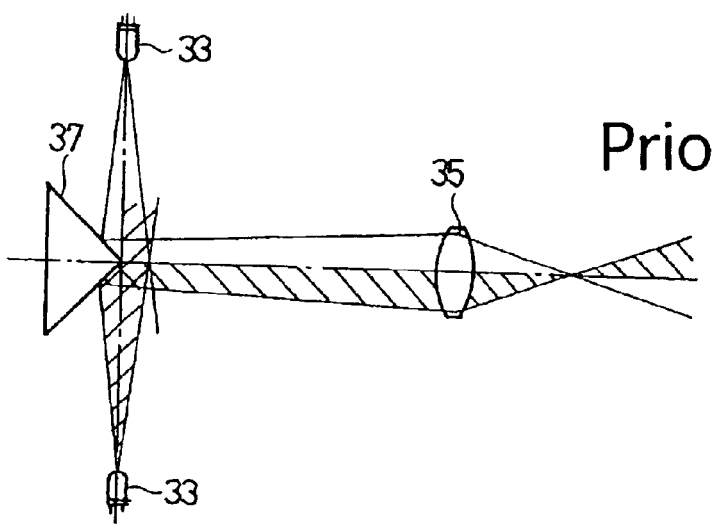
FIG. 4 is a diagrammatic representation, viewed from above, of a second conventional survey point indicating instrument for indicating a survey point.
Figure 5:
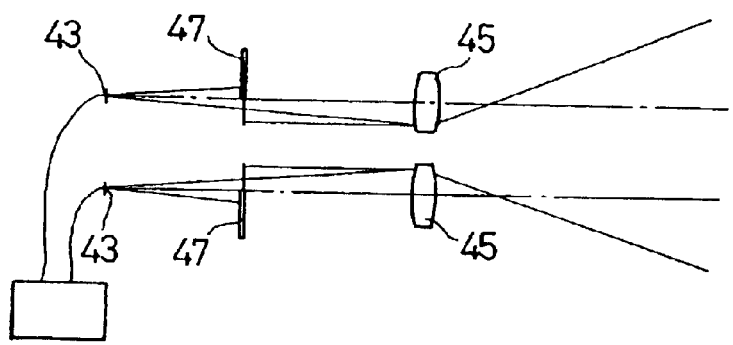
FIG. 5 is a diagrammatic representation, viewed from above, of a third conventional survey point indicating instrument for indicating a survey point.

As can be understood from the foregoing, the production cost can be reduced since the survey point indicating instrument requires only one collimating lens and no reflector. Moreover, the power consumption of the survey point indicating instrument can be reduced since a survey point can be indicated by primary light rays, not secondary light rays, since the survey point indicating instrument uses no translucent plate such as the translucent plate 27 shown in FIG. 3. Furthermore, a survey point can be easily indicated even from a long distance since the light emitted from the two light sources toward the target can easily be recognized visually by appropriately changing the lighting conditions (e.g., light-emitting pattern, light color and intensity) of each light source.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A survey point indicating instrument for recognizing a line of sight visually, said survey point indicating instrument comprising:
    a collimating lens;
    two light sources positioned so that optical axes of said two light sources intersect each other on an optical axis of said collimating lens at a focal point of said collimating lens;
    a driving circuit for controlling light emissions of said two light sources independently from each other; and
    a light shield plate having a slit, and positioned between said focal point and said two light sources so that light rays emitted from each of said two light sources to travel in an area between said optical axes are allowed to pass through said slit while other light rays emitted from each of said two light sources are cut off by said light shield plate to prevent said other light rays from traveling outside said area between said optical axes.

2. The survey point indicating instrument according to claim 1, wherein said driving circuit controls said light emissions of said two light sources so that said two light sources flash periodically at different frequencies.

3. The survey point indicating instrument according to claim 1, wherein said two light sources emit different colored lights.

4. The survey point indicating instrument according to claim 1, wherein said two light sources emit red light and green light, respectively.

5. The survey point indicating instrument according to claim 1, wherein, among light rays which are passed through said slit to intersect each other at said focal point, light rays thereof incident on a central portion of said collimating lens are collimated thereby to travel as a parallel light beam after passing through said collimating lens, while other light rays thereof incident on a peripheral portion of said collimating lens firstly converge after passing through said collimating lens, and subsequently diverge.

6. The survey point indicating instrument according to claim 1, wherein each of said two light sources comprises an LED.

7. A survey point indicating instrument comprising:
    a collimating lens;
    two light sources positioned behind said collimating lens so that optical axes of said two light sources intersect each other on an optical axis of said collimating lens at a back focal point of said collimating lens;
    a light shielding device, positioned between said collimating lens and said two light sources, for cutting off light rays emitted from each of said two light sources to prevent light rays from traveling outside an area between said optical axes, and for allowing said light rays emitted from each of said two light sources to travel within said area to pass therethrough; and
    a driving circuit for controlling light emissions of said two light sources independently from each other.

8. The survey point indicating instrument according to claim 7, wherein said light shielding device comprises a light shield plate positioned between said back focal point of said collimating lens and said two light sources.

* * * * *